UNITED STATES PATENT OFFICE.

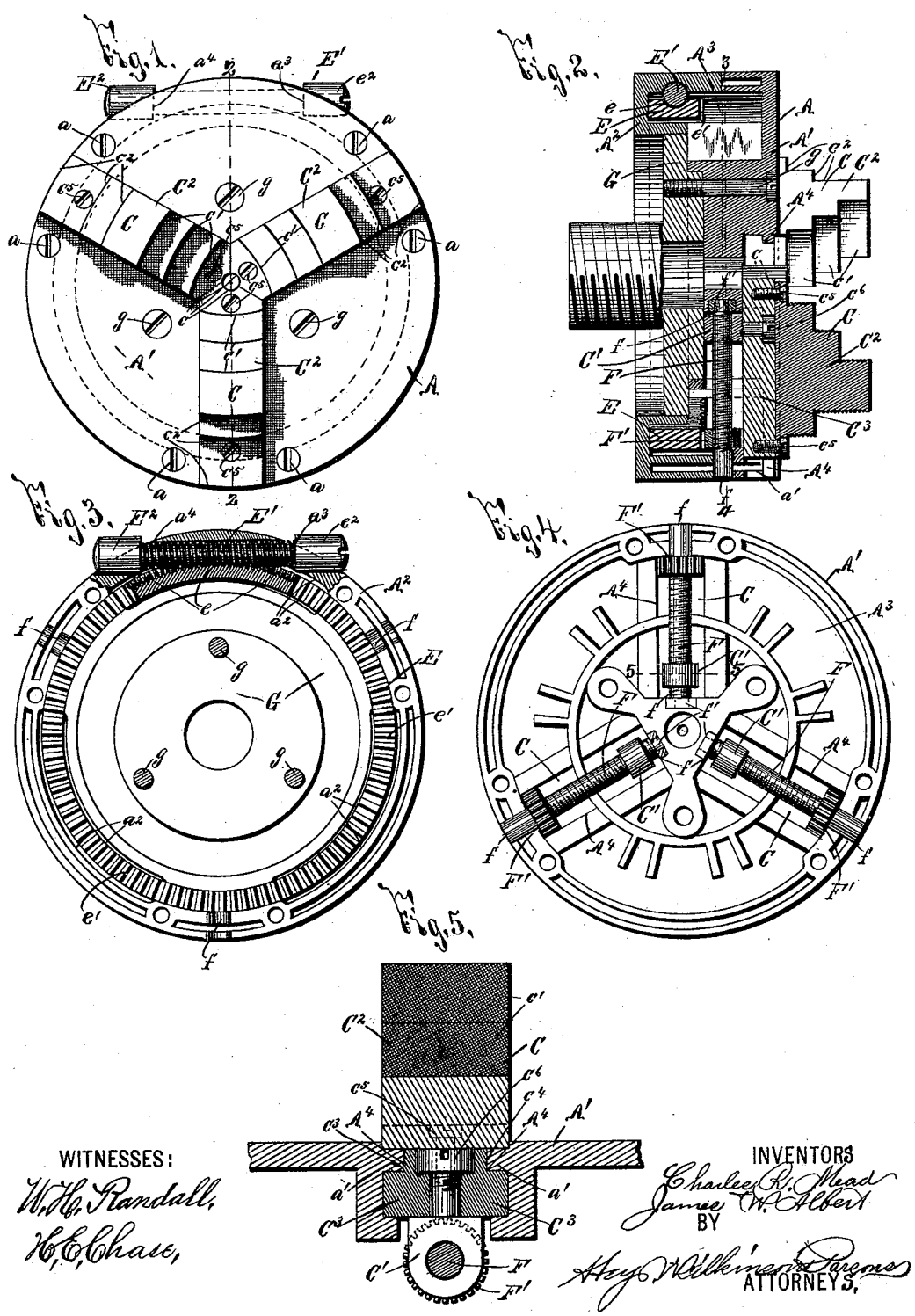

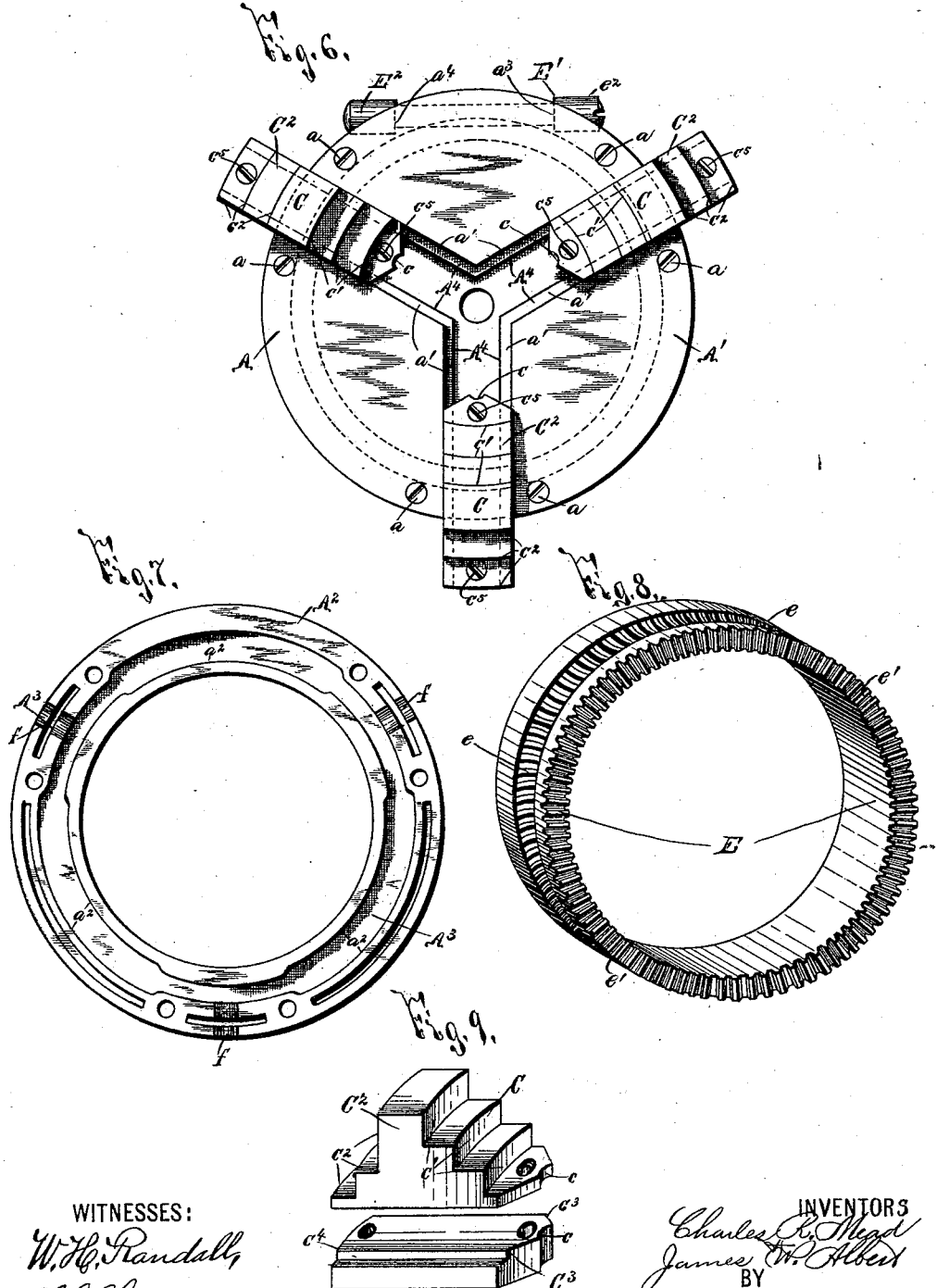

CHARLES R. MEAD AND JAMES W. ALBERT, OF ONEIDA, NEW YORK.

CHUCK.

SPECIFICATION forming part of Letters Patent No. 455,003, dated June 30, 1891.

Application filed February 16, 1891. Serial No. 381,641. (No model.)

*To all whom it may concern:*

Be it known that we, CHARLES R. MEAD and JAMES W. ALBERT, of Oneida, in the county of Madison and State of New York, have invented new and useful Improvements in Chucks, of which the following, taken in connection with the accompanying drawings, is a full, clear, and exact description.

Our invention relates to an improved lathe-chuck of the character for which Charles R. Mead has obtained Letters Patent of the United States Nos. 321,740, 372,482, and 408,985, dated, respectively, July 7, 1885, November 1, 1887, and August 13, 1889, and has for its object the production of a simple and effective universal chuck, which is extremely effective, durable, and strong, and is readily and cheaply manufactured.

To this end the invention consists, essentially, in a recessed chuck-head, an annular rocking ring or disk closely fitting within the recessed head and formed with screw-threads on its periphery, a tangentially-extending screw for engaging the screw-threads, jaws guided radially in the chuck-head, a screw for engaging and actuating said jaws, and a wheel provided on the latter screw for engaging said rocking ring.

The invention also consists in the detail construction and arrangement of the parts, all as hereinafter more particularly described, and pointed out in the claims.

In describing this invention reference is had to the accompanying drawings, forming a part of this specification, in which like letters indicate corresponding parts in all the views.

Figure 1 is a face view of our improved invention. Fig. 2 is a longitudinal sectional view, taken on line 2 2, Fig. 1, of the parts as illustrated in said figures. Figs. 3 and 4 are opposite plan views taken on opposite sides of the section-line 3 4, Fig. 2. Fig. 5 is a vertical sectional view taken on line 5 5, Fig. 4. Fig. 6 is a top plan view illustrating the adjacent extremities of the jaws as considerably separated from each other. Fig. 7 is a top plan view of the rear plate of the chuck. Fig. 8 is an isometric perspective of the rocking ring or disk; and Fig. 9 is an isometric perspective of the jaw, the two halves being shown as separate.

A represents the chuck-head, which is of desirable form and construction for use in the ordinary or any special style of machine. As preferably constructed, this head is composed of the front and rear plates or disks $A'$ and $A^2$, secured together by screws $a$, with a recess $A^3$ formed in the adjacent faces of said plates for receiving the working parts of our invention.

C represents the chuck-jaws, which are radially movable in guides $A^4$, formed in the front disk or plate $A'$. As preferably constructed, the jaws C are formed with the front biting-faces $c$, adapted to engage a drill or other tool, and with the outer and inner angularly-shaped bearing or biting faces $c'$ and $c^2$, formed by angular cut-outs at the upper portion of the opposite ends of the jaws. The front cut-outs $c'$ may impinge the outside and the rear cut-outs $c^2$ the interior wall of an article to be held by the chuck. The guides $A^4$ are formed on their side walls with a projecting longitudinal rib or shoulder $a'$, and formed on the sides of the jaws C are corresponding bearing-recesses $c^3$ and $c^4$.

Movable within the recess $A^3$, and preferably closely fitting its periphery, which is suitably recessed at $a^2$ for the purpose of reducing the friction, is the annular rocking ring or plate E, formed with a screw-threaded groove $e$ on its outside periphery and with engaging-teeth $e'$ on its upper face.

$E'$ represents a tangentially-extending screw, which engages the threaded groove $e$, and is formed with a head $e^2$ at one extremity, that abuts against a shoulder $a^3$ on the chuck-head, and provided at the other extremity with a nut $E^2$, that bears against a shoulder $a^4$, also formed on the chuck-head, whereby the ring E is rocked upon the movement of the screw $E'$.

Suitably journaled in the head A at its opposite extremities at $ff$, with a steel bushing $f'$ at its inner end, is a screw-threaded rod F, upon which is a screw-threaded eye $C'$, depending from the jaw C.

At the outer extremity of the rod F is a gear-wheel $F'$, that engages the teeth $e'$ on the upper face of the ring E, whereby when the ring is rocked the jaws are moved inward or outward in their guides with absolute regularity, since, as said screw-threaded rod is prevented from movement, the eye C' must necessarily travel along the screw.

Secured by screws $g$ is the rear face-plate G, which may be of any suitable form, size, and construction for securing the chuck to the desired machine.

In order to simplify the construction of the jaw C, it is composed of the opposite halves $C^2$ and $C^3$, secured together by screws $c^5$, and the eye C', provided with a screw-threaded upper extremity, which engages a nut $c^6$, interposed between the opposite divisions of the jaw.

When constructed as described, the separate divisions of the jaw upon the wear of the parts may be separated and replaned, thus greatly increasing the durability of the device and permitting the enhancement of its efficiency. It is evident that the screw E' operates the ring E with great force, and that with absolute certainty each of the jaws is movable toward and away from the center with perfect regularity, thus rendering the device highly efficient. Moreover, the parts are very simple in construction and can be readily produced with a minimum degree of labor and skill. It is evident, however, that the detail construction and parts of our invention may be somewhat varied from that shown and described without departing from the spirit thereof.

Having thus fully described our invention, what we claim as new, and desire to secure by Letters Patent, is—

1. In a lathe-chuck, the combination of a head having radial guides, jaws movable in said guides, a rocking ring connected, substantially as described, for adjusting said jaws, an engaging face or teeth on the periphery of said ring, and a tangentially-extending screw for engaging and rocking said ring, and thereby radially adjusting the jaws, substantially as and for the purpose set forth.

2. In a lathe-chuck, the combination, with the chuck-head having guide-ribs, of the separable jaw-composing divisions or plates provided with a recess or groove in the edge of the face of one of said plates immediately adjacent to the other plate, clamps for securing said divisions together, and engaging faces at the front extremity of each of the separable plates, a rocking plate for adjusting said jaws, and a tangentially-extending screw for actuating said rocking plate, substantially as and for the purpose specified.

3. In a lathe-chuck, the combination of a head having radial guides, jaws movable in said guides, screws for engaging said jaws, a rocking ring for revolving said screws and adjusting the jaws, an engaging face or teeth on the periphery of said ring, and a tangentially-extending screw for engaging and rocking said ring and thereby radially adjusting the jaws, substantially as and for the purpose set forth.

4. In a lathe-chuck, the combination, with the chuck-head having guide-ribs, of the separable jaw-composing divisions or plates provided with the recess or groove in the edge of the face of one of said plates immediately adjacent to the other plate, clamps for securing said divisions together, and engaging faces at the front extremity of each of the separable plates, an inwardly-extending cut-out or recess in the rear extremity of the top face of the upper plate, a rocking plate for adjusting said jaws, and a tangentially-extending screw for actuating said rocking plate, substantially as and for the purpose specified.

5. In a lathe-chuck, the combination, with the chuck-head having guide-ribs, of the separable jaw-composing divisions or plates provided with a recess or groove in the edge of the face of one of said plates immediately adjacent to the other plate, clamps for securing said divisions together, a downwardly-extending projection on the lower plate, a screw for engaging said projection, a rocking ring connected, substantially as described, for adjusting said jaws, an engaging face or teeth on the periphery of said ring, and a tangentially-extending screw for engaging and rocking said ring, thereby radially adjusting the jaws, substantially as and for the purpose set forth.

6. In a lathe-chuck, the combination, with the chuck-head having guide-ribs, of the separable jaw-composing divisions or plates provided with the recess or groove in the edge of the face of one of said plates immediately adjacent to the other plate, clamps for securing said divisions together, a downwardly-extending projection on the lower plate provided with a screw-threaded extremity engaged with the lower plate, a nut interposed between said plates and engaged with said extremity, revoluble screws for engaging said projections, a rocking ring connected, substantially as described, for adjusting said jaws, an engaging face or teeth on the periphery of said ring, and a tangentially-extending screw for engaging and rocking said ring, and thereby radially adjusting the jaws, substantially as and for the purpose specified.

7. In a lathe-chuck, the combination of a head having radial guides, jaws movable in the guides, eyes on the jaws, the radially-extending revoluble screws having their opposite extremities journaled in said head, a hardened bushing for the inner extremity of said screws, a wheel on said rods, a rocking ring for rotating said wheels and adjusting the jaws, a curved groove in the periphery of the wheel, teeth formed in said groove, and a tangentially-extending screw journaled in said chuck-head and engaged with said teeth, substantially as and for the purpose set forth.

In testimony whereof we have hereunto signed our names, in the presence of two attesting witnesses, at Oneida, in the county of Madison, in the State of New York, this 16th day of January, 1891.

CHARLES R. MEAD.
    JAMES W. ALBERT.

Witnesses:
 JAMES TOHER,
 DANIEL E. RYAN.